(12) United States Patent
Saad et al.

(10) Patent No.: US 11,082,220 B1
(45) Date of Patent: Aug. 3, 2021

(54) SECURING RECOVERY DATA DISTRIBUTED AMONGST MULTIPLE CLOUD-BASED STORAGE SERVICES

(71) Applicant: EMC IP Holding Company LLC, Hopkinton, MA (US)

(72) Inventors: Yossef Saad, Ganei Tikva (IL); Itay Glick, Ramat Hasharon (IL)

(73) Assignee: EMC IP Holding Company LLC, Hopkinton, MA (US)

(*) Notice: Subject to any disclaimer, the term of this patent is extended or adjusted under 35 U.S.C. 154(b) by 116 days.

(21) Appl. No.: 16/655,491

(22) Filed: Oct. 17, 2019

(51) Int. Cl.
*H04L 9/08* (2006.01)
*G06F 11/14* (2006.01)
*H04L 9/30* (2006.01)
*H04L 9/32* (2006.01)

(52) U.S. Cl.
CPC ........ *H04L 9/0894* (2013.01); *G06F 11/1464* (2013.01); *G06F 11/1469* (2013.01); *H04L 9/085* (2013.01); *G06F 2201/82* (2013.01)

(58) Field of Classification Search
CPC .... H04L 9/0894; H04L 9/085; G06F 11/1464; G06F 11/1469; G06F 2201/82
See application file for complete search history.

(56) References Cited

U.S. PATENT DOCUMENTS 10,505,723 B1* 12/2019 Griffin ................ H04L 9/30
10,623,386 B1* 4/2020 Bernat ................ H04L 9/0822

OTHER PUBLICATIONS

"A Key Based Secure Threshold Cryptography for Secret Image"—Naskar et al, International Journal of Network Security, vol. 18, No. 1, pp. 68-81, Jan. 2016 http://ijns.jalaxy.com.tw/contents/ijns-v18-n1/ijns-2016-v18-n1-p68-81.pdf (Year: 2016).*

"Distributed Backup Scheme for Non-Custodial Wallets Using Shamir Secret Sharing"—Tapadia et al, Hexawallet, Apr. 2019 https://hexawallet.io/wp-content/uploads/2019/07/Hexa-Wallet-Backup-Scheme-SSS-WP_-1.0.pdf (Year: 2019).*

* cited by examiner

*Primary Examiner* — Randy A Scott
(74) *Attorney, Agent, or Firm* — Dergosits & Noah LLP; Todd A. Noah

(57) ABSTRACT

Described is a system for securing recovery information that is distributed amongst multiple cloud-based systems. Encrypted recovery data may be stored on at least one cloud-based system. To decrypt the recovery data, coordination between multiple cloud-based systems may be required to obtain the encryption key. Accordingly, a production system does not have to perform key management. Therefore, even if the production system is compromised by a malicious party, the encryption key remains secure as multiple cloud-based systems would also have to be compromised. In addition, the system may coordinate the creation and distribution of the recovery information, as well as the acquisition of such recovery information as part of a data recovery process. Thus, the system may secure recovery information by leveraging multiple cloud-based systems (or services).

20 Claims, 6 Drawing Sheets

SECURING RECOVERY DATA DISTRIBUTED AMONGST MULTIPLE CLOUD-BASED STORAGE SERVICES

TECHNICAL FIELD

This disclosure relates to securely storing recovery data, and more particularly, securing recovery data by using multiple cloud-based storage systems.

BACKGROUND

Cloud-based data storage systems may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. To provide additional levels of security, recovery data may be stored across multiple providers (e.g. vendors, or entities) of cloud-based services to allow critical data to be recovered in the event of a failure in both a production system and one or more of the cloud-based systems. However, clients are often still reluctant to store critical data in cloud-based systems because it requires relinquishing a certain amount of security control to a third-party. For example, security mechanisms implemented by a client's production system may be different than a provider's cloud-based system. Moreover, employees of a client's production system may be required to undergo organizational security screening and training, while employees of a cloud-based provider may not be fully approved according to the client's organizational standards. Finally, cloud-based providers may be a high value target for malicious parties (e.g. hackers), and accordingly, the risk of an eventual security attack may be increased. Thus, there is a continued need to improve security measures for cloud-based recovery data, even in circumstances where the data is stored across multiple providers.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
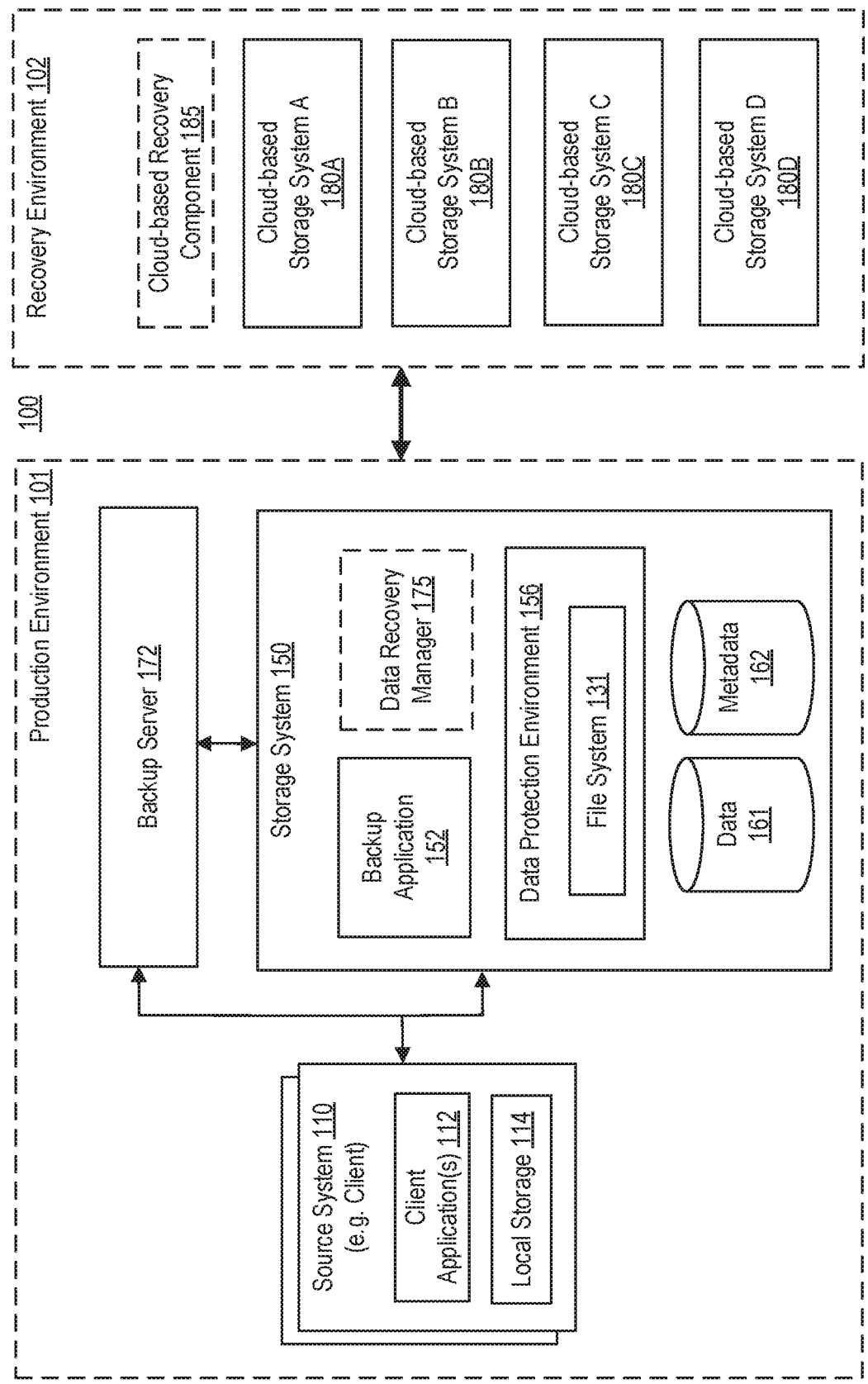
FIG. 1 is a block diagram illustrating an example operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for securing recovery information that is distributed amongst a set of cloud-based storage systems. In some embodiments, the recovery information may include recovery data that is encrypted and stored on at least one cloud-based storage system. However, in order to decrypt the recovery data, coordination between multiple cloud-based storage systems (e.g. third-party systems) may be required to obtain an encryption key. Accordingly, a production system itself does not have to perform key management. Therefore, even if the production system is compromised by a malicious party, the encryption key remains secure as multiple cloud-based systems would also have to be comprised. Moreover, individual cloud-based storage systems cannot access the recovery data without coordination with other systems. To provide such an ability, the system may implement a configuration that leverages a secret sharing mechanism for the encryption key.

In addition, the system may implement a component (e.g. manger) that coordinates the creation and distribution of recovery information, as well as the secure acquisition of such recovery information as part of a data recovery process. Thus, the system may secure recovery information by leveraging multiple cloud-based storage systems (or services).

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes backup and disaster recovery services. For example, at least some functionality may be provided by, or implemented in connection with, various platforms such as the Data Domain data protection platform provided by Dell EMC™ Corporation, and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 according to one or more embodiments of the disclosure. As shown, the operating environment 100 may include a production environment (or system) 101 and a recovery environment (or system) 102. It should be noted that the components of operating environment 100 may interact via a network, which may be any type of wired or wireless network including a local area network (LAN), a wide area network (WAN), or a direct communication link, or other suitable connection.

The production environment (or production system) 101 may provide data protection and data recovery (or disaster recovery) services to a client (or customer). In some embodiments, the data protection and data recovery services may include backup services for storing data (or backup data) originating from the source storage system 110 within the production environment 101, and data recovery services that store recovery information within the recovery environment (or disaster recovery environment) 102. For example, the recovery environment 102 may store additional redundancies of the data (e.g. as recovery information) to provide a secure infrastructure for recovering production data as further described herein.

The source system (or client system) 110 may act as a client from which data to be protected originates. For example, the source system 110 may be a source of data to be backed-up to the production environment 101 and recovered, in the event of data loss, using the recovery environment 102. In some embodiments, the source system 110 may comprise a virtual machine. The source system 110 may host one or more client applications 112, and may include local storage 114, as well as an interface for communicating with other systems and devices, such as the storage system 150. In general, the client applications 112 may create new and/or modified data that is desired to be protected. As such, the source system 110 is an example of a host device. The local storage 114 can be used to locally store data, which may be backed up using the storage system 150. The backed-up data can be restored, as further described herein, to the local storage 114.

The storage system 150 may perform various operations to provide data protection and recovery services. In some embodiments, the storage system 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the environment 100. In some embodiments, the backup server 172 may be an EMC Corp. Avamar server or an EMC Corp. Networker server, although no particular server is required, and other backup and storage system configuration are contemplated.

In the context of providing backup services, data to be backed-up may be communicated from the source system 110 to the backup application 152 for initial processing, after which the processed data is uploaded to the data protection environment 156 as data (or backup data) 161. In some embodiments, the backup application 152 may cooperate with a backup client application of the source system 110 to back up client data to the data protection environment 156. A backup application 152 may also cooperate with a backup client application to restore data to the source system 110. In some embodiments, the backup application 152 may be a part of, or work in conjunction with, a storage appliance. For example, the storage appliance may include a Dell-EMC CloudBoost appliance, although any suitable appliance is contemplated.

The data protection environment 156 may store metadata 162 for the data 161 and include one or more instances of a filesystem 131 that catalogs files and other data residing in the data protection environment 156 and/or recovery environment 102.

In the context of providing data recovery (or disaster recovery) services, a data recovery manager 175 may encrypt the data 161 to be stored in a redundant manner within the recovery environment 102. The data recovery manager 175 may coordinate (or manage, orchestrate, automate, etc.) a workflow (or process) for providing data recovery services (e.g. deriving shared encryption keys, encrypting data, distributing recovery information, collecting recovery information, reconstructing the secret key, decrypting and recovering the data, etc.) as further described herein. In some embodiments, the data recovery manager 175 may be part of the storage system 150 as shown. However, the data recovery manager 175 may also be part of a separate (e.g. standalone system) that works in conjunction with the storage system 150. In addition, in some embodiments, the data recovery manger 175 may work in conjunction with component of the recovery environment 102 (e.g. cloud-based recovery component 185). In some embodiments, the data recovery manager 175 may direct (or initiate) the cloud-based recovery component 185 to perform various operations.

In some embodiments, the production environment 101 may be an on-premises system and the recovery environment 102 may be a cloud-based system. In some embodiments, the production environment 101 may also be provided as part of a cloud-based service. However, an entity providing the production environment 101 may be different than the entity (or entities) providing the recovery environment 102. Accordingly, the one or more physical components (e.g. servers) of the storage systems (e.g. cloud-based storage systems) 180 may be provided by a different entity than the entity that provides the physical components of the production system 101. For example, the production system 101 may be provided as part of Dell/EMC Data Domain™ data protection platform, and each of the storage systems 180A-D may be provided by a different entity providing cloud-based services (e.g. Amazon Web Services (AWS) platform, Microsoft Azure platform, etc.). Accordingly, in some embodiments, the storage systems 180 may be provided as part of a client account managed by a distinct entity (e.g. Amazon, Microsoft, etc.) and associated with the client (or customer) of a data protection and recovery service provided by the production environment 101. For example, a client of a data protection and recovery service may also be a client of one or more cloud-based storage services provided by the storage systems 180. For example, to provide additional security and redundancy, each of the storage systems 180A-D may be provided by a different entity.

The recovery environment 102 may include, or be formed from, a set of storage systems (e.g. cloud-based storage systems) 180. Each storage system 180A-D may store recovery information used to recover or restore data 161 stored by the production environment 101. For example, to provide a degree of redundancy, each of the storage systems 180A-D may store an instance (or copy) of the recovery information, or a portion thereof, as further described herein.

The recovery environment 102 may include a cloud-based recovery component 185. In some embodiments, the cloud-based recovery component 185 may be a part of, or work in conjunction with, one or more storage systems 180. However, the cloud-based recovery component 185 may also be part of a system that is distinct (e.g. from a different provider or entity) from a storage system 180, and/or may be part of the production environment 101. For example, some or all of the operations performed by the cloud-based recovery component 185 may be performed by, or at the direction of, the data recovery manager 175.

The cloud-based recovery component 185, and/or the data recovery manager 175 may include various security tools. These tools may include various software components, APIs, libraries, classes, etc. to implement additional security features or capabilities to ensure an authorized user (or party) may initiate operations associated with a recovery process such as collecting (or retrieving, obtaining, etc.) the recovery information from the storage systems 180. In some embodiments, the tools may implement various features or policies such as requiring dual sign-on procedures for certain administrative actions. For example, a dual sign-on (or verification) procedure may require a regular system administrator sign-on (or verification) plus a second authorized person (e.g. a "Security Officer") to perform certain administrative operations associated with a recovery process. The dual sign-on requirement may ensure that certain administrative actions are under the purview and control of a higher authority above and beyond the system administrator. For example, a dual sign-on may be required to initiate the collection of the recovery information (e.g. shared keys) stored by the one or more of the storage systems 180.

As described, as part of a data recovery service, components of the production environment 101 may distribute recovery information to a set of storage systems 180 as further described with reference to FIG. 2.

Figure 2:
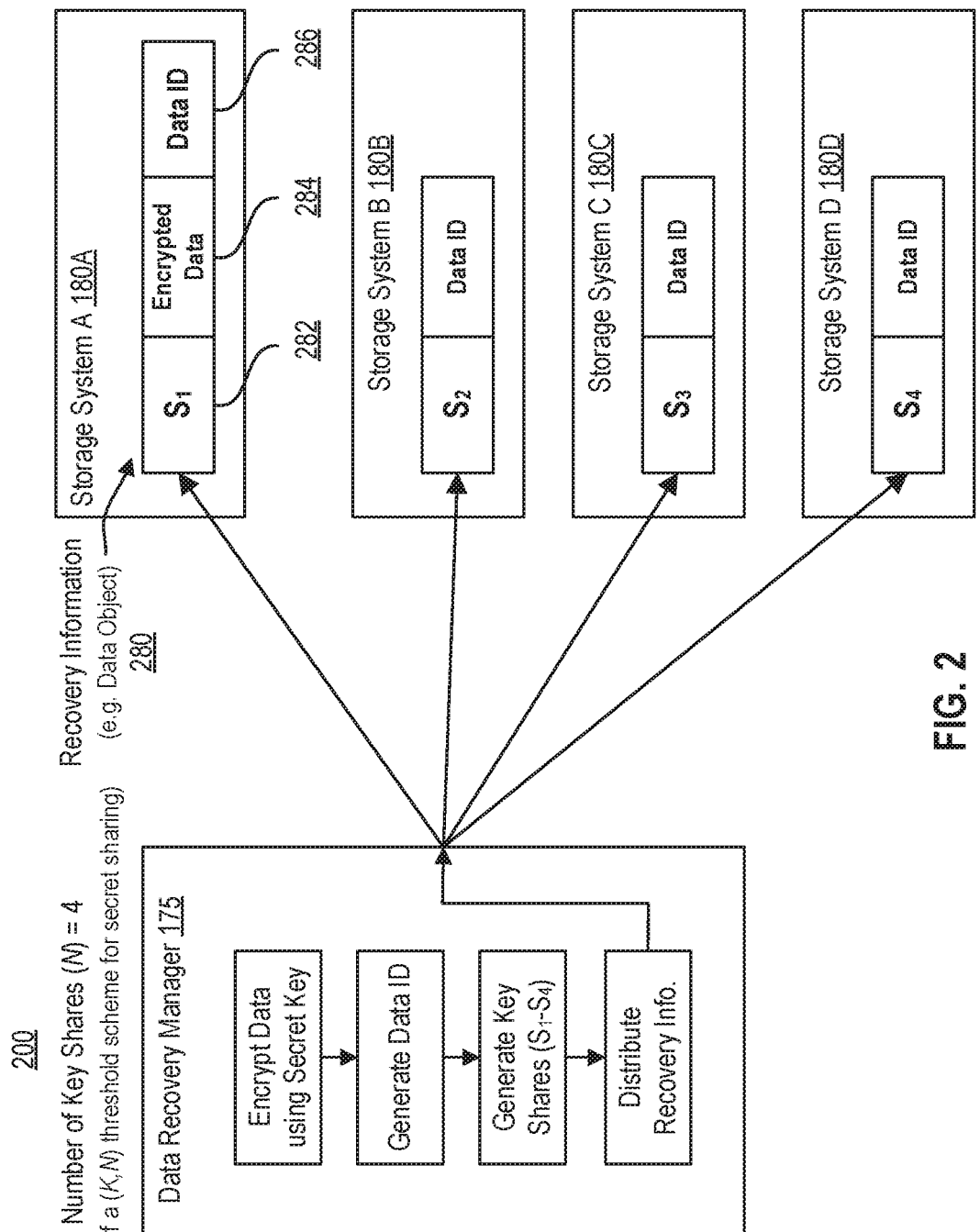
FIG. 2 is a diagram illustrating an example of a secure distribution of recovery information to a set of cloud-based storage systems according to one or more embodiments of the disclosure.

FIG. 2 is a block diagram 200 illustrating an example of a secure distribution of recovery information to a set of cloud-based storage systems according to one or more embodiments of the disclosure.

As shown, components the production environment 101 may distribute recovery information 280 to a set of cloud-based storage systems (or storage systems) 180, which in this example, includes four (4) storage systems 180A, 180B, 180C, and 180D. In some embodiments, each storage system 180A-D may be associated with a client account. For example, a client (or customer) of a data protection and recovery service may also be associated with different cloud-based storage services provided on by the different storage systems 180A-D, which may be remote from components of the production environment 101. In addition, each storage system 180A-D may be provided by a different entity (or provider, vendor, company, organization, etc.) than the entity providing data protection and recovery services within the production environment 101.

To create recovery information 280, the data recovery manager 175 (or another component within the production environment 101) may first encrypt data (e.g. data 161) using a secret key. The secret key can be any suitable key such as a randomly generated number that is only known to components (e.g. data recovery manager 175) of the production environment 101. In addition, any suitable encryption technique (or method, algorithm, etc.) may be used to generate encrypted data 284. In order to identify the encrypted data 284, a data identifier (data ID) 286 may be associated with the encrypted data 284. For example, the data identifier 286 may be a hash value (or portion thereof) generated from the data (e.g. data 161) that is encrypted.

In some embodiments, the secret key (S) remains secure via distribution. Accordingly, the recovery manager 175 itself does not have to perform key management. Therefore, even if the production environment 101 is compromised by a malicious party, the secret key remains secure. To secure the secret key in such a manner, the system may rely on a secret sharing technique. In some embodiments, a Shamir's Secret Sharing technique (e.g. algorithm) may be used to secure the secret key (S) in a distributed way. For example, the secret key (S) may be split into multiple parts, called key shares. These key shares may then be used to reconstruct the original secret key (S). Specifically, to reconstruct the secret key (S), a minimum number of key shares (K) are required, which is referred to a threshold.

In general, Shamir's Secret Sharing technique may be implemented to divide the secret key (S) into N key shares (or pieces of data) $S_1 \ldots, S_N$ in such a way that: 1) knowledge of any K or more key shares allows secret key (S) to be computed, or put another way, secret key (S) may be reconstructed from any combination of K key shares; and 2) knowledge of any K−1 or fewer key shares leaves secret key (S) completely undetermined, or put another way, the secret key (S) cannot be reconstructed with fewer than K key shares. Such a scheme may be referred to as a (K, N) threshold scheme. Thus, if K=N, then every key share (e.g. every piece of the original secret key (S)) is required to reconstruct the secret key (S). For more details, a complete description of Shamir's Secret Sharing technique may be found in Adi Shamir, "How to Share a Secret," Commun. ACM, Vol. 22, No. 11, 612-613 (November 1979), which is incorporated by reference in its entirety herein.

Returning to the example of diagram 200, to secure the secret key (S) in a distributed way, the data recovery manager 175 may use a secret sharing algorithm based on a (K, N) threshold scheme, wherein N=4 based on the 4 storage systems 180A-D. Accordingly, 4 key shares ($S_1$-$S_4$) may be generated, with each corresponding to a different one of the storage systems 180A-D. For example, key share $S_1$ may correspond to storage system 180A, key share $S_2$ may correspond to storage system 180B, key share $S_3$ may correspond to storage system 180C, and key share $S_4$ may correspond to storage system 180D. As described, K may be set to a desired minimum number of storage systems 180 required to reconstruct the secret key (S), where 0<K≤N as further described with reference to diagram 300. As shown, once the data is encrypted and the corresponding key shares 282 are generated, the data recovery manager 175 may distribute such information to be stored on each storage system 180A-D as recovery information 280.

In some embodiments, to conserve storage resources while still requiring the coordination of multiple storage systems 180 for decryption, not all of the storage systems 180A-D may be required to store the encrypted data 284. For example, only one (or less that all) of the storage systems 180 may store the encrypted data 284, while all (or a required minimum number) of the storage systems 180 may store a corresponding key share 282. Diagram 200 shows an example of such embodiments. More particularly, as shown, the recovery information 280 sent to, and/or stored by, storage system 180A may include the corresponding key share 282, the encrypted data 284, and the data identifier (data ID) 286 (e.g. full recovery information). Thus, the recovery information 280 sent to, and/or storage by, the remaining storage systems 180B-D may include the only corresponding key shares 282 and the data identifier 286 (e.g. partial recovery information). Alternatively, although not shown in diagram 200, in some embodiments, one or more of the remaining storage systems 180B-D may also store the encrypted data 284. For example, storing the encrypted data 284 in one additional storage system (e.g. one of storage systems 180B-D) provides the ability to still be able to potentially decrypt the data in the event that there is a failure in storage system 180A.

Thus, the recovery information 280 is securely distributed amongst storage systems 180 (e.g. where N=4 of a (K, N) threshold scheme) as shown in this example. In addition, as part of a data protection and recovery service, the data recovery manager 175 may also ensure that the decryption of the encrypted data 284 is performed in a secure manner.

Figure 3:
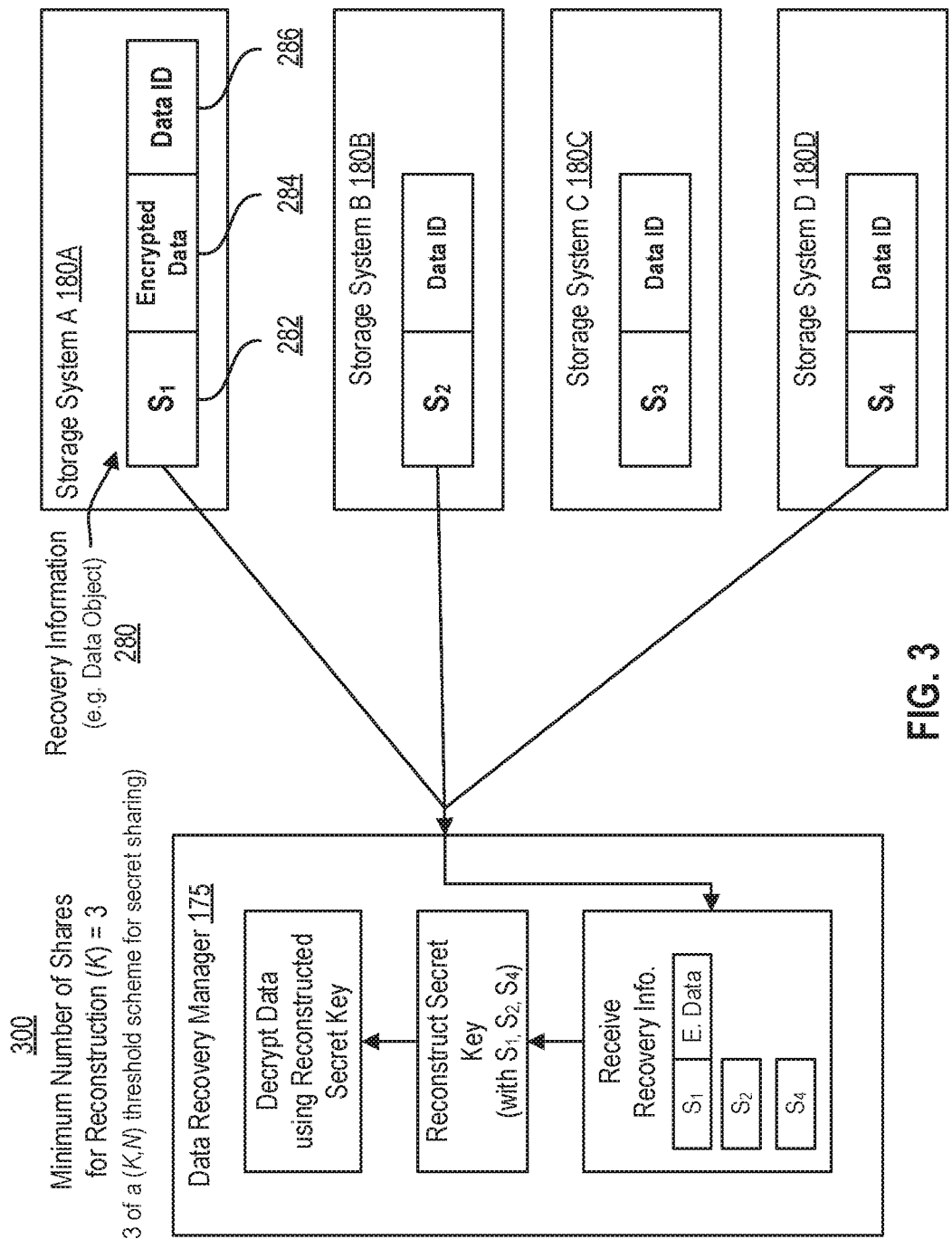
FIG. 3 is a diagram illustrating an example of a secure retrieval of recovery information secured amongst a set of cloud-based storage systems according to one or more embodiments of the disclosure.

FIG. 3 is a diagram illustrating an example of a secure retrieval of recovery information secured amongst a set of cloud-based storage systems according to one or more embodiments of the disclosure.

Continuing the example of diagram 200 (e.g. where N=4 of a (K, N) threshold scheme), diagram 300 shows an example where the minimum number of storage systems 180 required to decrypt the encrypted data 284 is set to three (3) (e.g. where K=3 and N=4 of a (K, N) threshold scheme). As shown, the recovery information 280 required to reconstruct the secret key (S) may be retrieved from at least three of the storage systems 180. In other words, at least three storage systems must coordinate to decrypt the encrypted data 284. It should be noted that since storage system 180A actually stores the encrypted data 284, its recovery information 280 may be selected as part of the recovery process. In addition, selection of the remaining storage systems 180 may be random, or based on particular criteria. For example, the criteria may include a priority order (or preference list), resource availability (e.g. bandwidth, CPU load, etc.) or cost-related factors (e.g. a cost associated with accessing an associated storage service). In this example, the data recovery manager 175 receives corresponding recovery information 280 from storage system 180A, storage system 180B, and storage system 180D (e.g. at least three storage systems 180 including a storage system that stores the encrypted data 284). Accordingly, in this example, the recovery information 280 received from storage system 180A includes the corresponding key share 282 (e.g. $S_1$), and the encrypted data 284, whereas the recovery information 280 received from storage systems 180B, and 180D include only the corresponding key shares 282 (e.g. $S_2$, and $S_4$ respectively).

Once the set of recovery information 280 is received, the data recovery manager 175 now has access to three key shares (e.g. $S_1$, $S_2$, and $S_4$), and the encrypted data 284. Accordingly, using the three key shares, the data recovery manager 175 can reconstruct the secret key (S). Once the secret key (S) is reconstructed (e.g. known), the data recovery manager 175 may decrypt the encrypted data 284 using the secret key (S). Thus, the decryption of the encrypted data 284 is performed in a secure manner by requiring coordination from at least three storage systems 180.

Figure 4:
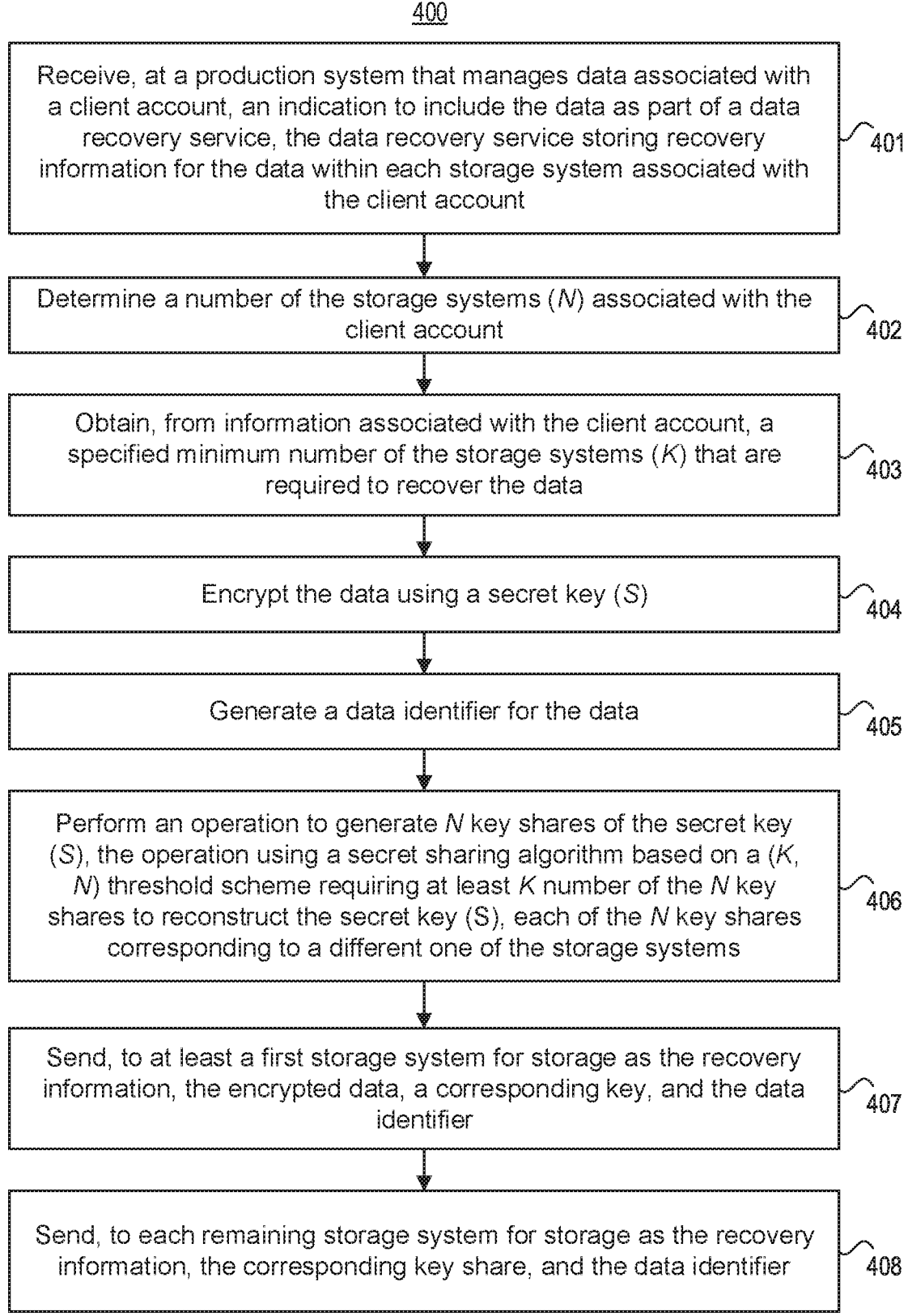
FIG. 4 is a flow diagram illustrating an example method of securely storing recovery information on a set of cloud-based storage systems according to one or more embodiments of the disclosure.

FIG. 4 is a flow diagram illustrating an example method of securely storing recovery information on a set of cloud-based storage systems according to one or more embodiments of the disclosure. Process 400 may use processing logic, which may include software, hardware, or a combination thereof. For example, process 400 may be performed by a system including one or more components (e.g. storage system 150, data recovery manager 175, etc.) described in operating environment 100.

In 401, the system (e.g. data recovery manager 175) may receive an indication to include data as part of a data recovery service. In some embodiments, the indication may be received at a production system (e.g. production environment 101) that manages the data (e.g. data 161) associated with a client account. For example, managing the data may include storing the data as backup data that originates from a source system associated with the client account. In some embodiments, the data recovery service may store recovery information (e.g. recovery information 280) for the data within each of the storage systems (e.g. each of the cloud-based storage systems 180A-D) associated with the client account. In some embodiments, the production system may be provided by a first entity, and each storage system associated with the client account may be remote from the production system. In addition, each storage system associated with the client account may be provided by a different entity than the first entity.

In 402, the system may determine a number of the storage systems (N) associated with the client account. For example, as shown in diagrams 200/300, a client (or client account) may be associated with four (4) storage systems (e.g. storage systems 180A-D), and accordingly, in such an example, the system would determine N as 4.

In 403, the system may obtain a specified minimum number of the storage systems (K) that are required to recover the data. In some embodiments, the specified minimum number of the storage systems (K) may be obtained from information associated with the client account. In some embodiments, a particular client may predefine such a number based on a security policy or a degree of security. For example, as shown in diagrams 200/300, the specified minimum number of storage systems may be set at three (3). Accordingly, in such an example, the system would determine K as 3.

In 404, the system may encrypt the data using a secret key (S). For example, the secret key (S) may be a randomly generated number. To provide a certain degree of security, the data may be encrypted on the production-side, and thus, may be encrypted within the production environment. For example, the secret key (S) may not be exposed to components outside of the production environment 101.

In 405, the system may generate a data identifier for the data. In some embodiments, generating the data identifier for the data may include generating a hash value from the data. For example, the generated hash value may be used as the data identifier. In some embodiments, the hash value may be generated using Secure Hash Algorithm (SHA), or other suitable hash function.

In 406, the system may perform (or execute, initiate, etc.) an operation (or function, method, etc.) to generate N key shares (or pieces) of the secret key (S). The operation may use any suitable secret sharing algorithm such as a Shamir's Secret Sharing algorithm. In some embodiments, the operation may use a secret sharing algorithm based on a (K, N) threshold scheme (e.g. using Shamir's Secret Sharing algorithm) requiring at least K number of the N key shares to reconstruct the secret key (S). As described, each of the N key shares may correspond to a different one of the storage systems. For example, as shown in diagrams 200/300, four key shares ($S_1$-$S_4$) may be created for the four storage systems 180A-D. Thus, as shown in such an example, key share $S_1$ corresponds to storage system 180A, $S_2$ corresponds to storage system 180B, $S_3$ corresponds to storage system 180C, and $S_4$ corresponds to storage system 180D.

As described, the system may then send (or distribute, transmit, etc.) such information to each of the storage systems for storage as recovery information (e.g. recovery information 280).

As described, in some embodiments, to conserve storage resources while still requiring the coordination of multiple storage systems for decryption, not all of the storage systems may be required to store the encrypted data. For example, only one (or less that all) of the storage systems may store the encrypted data, while all (or a required minimum number) of the storage systems may store a key share (e.g. as shown in diagram 200).

Thus, in such embodiments, in 407, the system may send, to at least a first storage system for storage as the recovery information, the encrypted data, a corresponding key, and the data identifier. For example, as shown in diagram 200, storage system 180A (e.g. first storage system) stores the encrypted data 284, the corresponding key share 282 (e.g. key share $S_1$), and the data identifier 286 as the recovery information 280. In some embodiments, the encrypted data, the corresponding key share, and the data identifier comprising the recovery information of the first storage system may be stored together as a data object.

In 408, the system may send, to each remaining storage system (e.g. N−1 storage systems) for storage as the recovery information, the corresponding key share, and the data identifier. For example, as shown in diagram 200, the storage systems 180B-D (e.g. the remaining storage systems) each only store the corresponding key share 282 (e.g. $S_1$, $S_2$, and $S_3$ respectively), and the data identifier 286 as the recovery information 280. Accordingly, in diagram 200, only one of the storage systems (e.g. storage system 180A) stores the actual encrypted data 284 while all of the storage systems store a key share 282.

Alternatively, in some embodiments, all (or more than one) of the storage systems may store the encrypted data. Accordingly, in some embodiments, the system may send to one or more of the remaining storage systems the encrypted data together with the corresponding key share, and the data identifier.

As a result of such a process, recovery information may be secured by leveraging multiple cloud-based storage systems (or services). Thus, even if one (or less then K) of the systems is comprised, the recovery information remains secure.

In response to recovery event that requires recovery of data, the system may also perform a secure recovery process.

Figure 5:
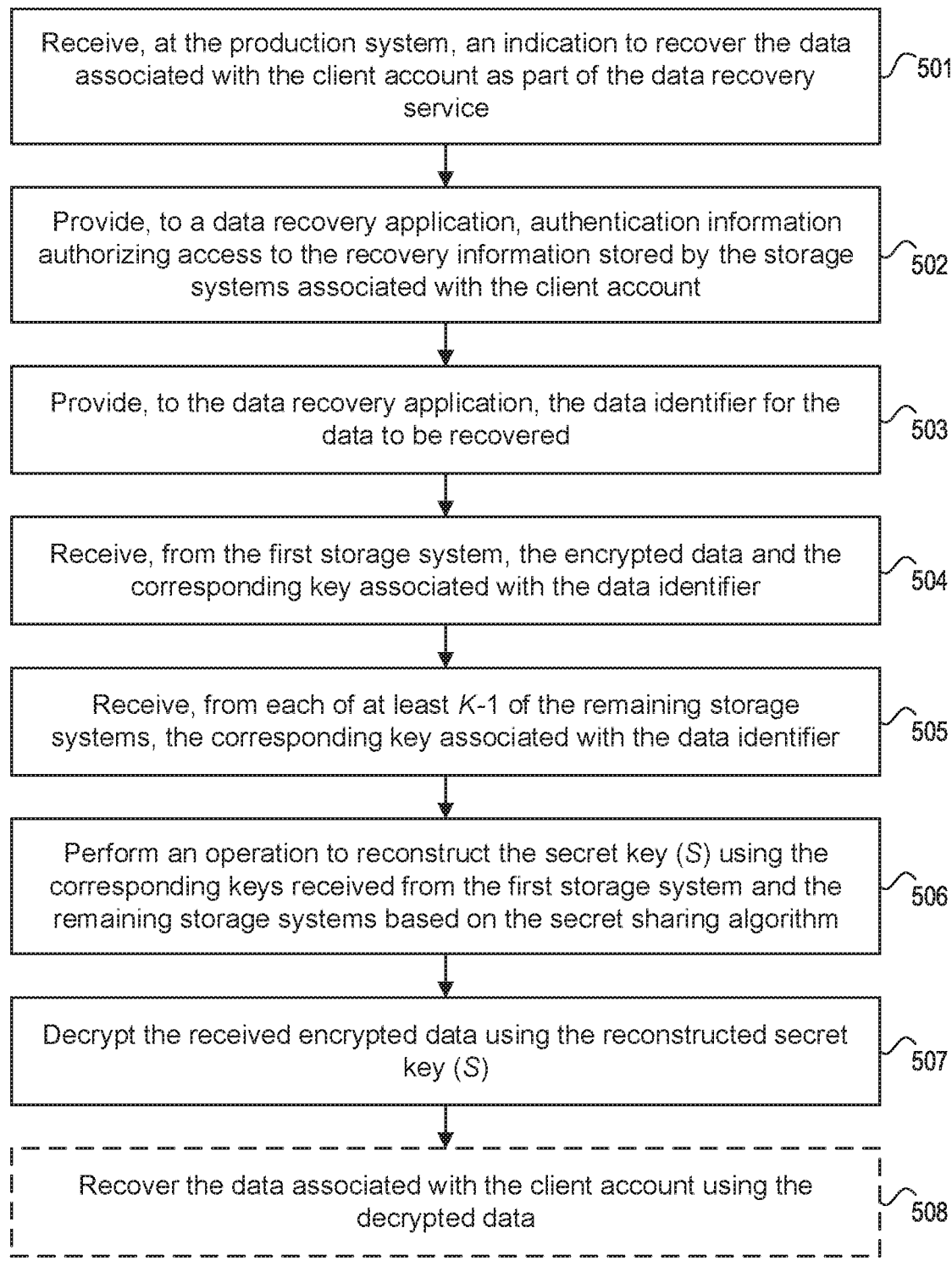
FIG. 5 is a flow diagram illustrating an example method of recovering data that is secured amongst a set of cloud-based storage systems.

FIG. 5 is a flow diagram illustrating an example method of recovering data that is secured amongst a set of cloud-based storage systems. Process 500 may use processing logic, which may include software, hardware, or a combination thereof. For example, process 500 may be performed by a system including one or more components (e.g. storage system 150, data recovery manager 175, cloud-based recovery component 185, etc.) described in operating environment 100.

In 501, the system (e.g. data recovery manager 175) may receive an indication to recover the data (e.g. data 161) associated with the client account as part of the data recovery service. In some embodiments, the indication may be received by a component of the production system (e.g. production environment 101).

In 502, the system may provide, to a recovery application, authentication information authorizing access to the recovery information (e.g. recovery information 280) stored by the storage systems (e.g. storage systems 180) associated with the client account. In some embodiments, the recovery application may be a part of, or work in conjunction with, a cloud-based data recovery component (e.g. cloud-based recovery component 185), which may be part of the recovery environment 102. In some embodiments, the recovery application may coordinate with components of a storage system to obtain recovery information. For example, a data recovery manager (e.g. data recovery manager 174 of the production environment 101) may provide authentication information to one or more cloud-based components to ensure a party is authorized to access the recovery information stored by one or more of the storage systems. The authentication information may include any information such as a credential, password, biometric, etc. to prevent unauthorized access. In addition, in some embodiments, the authentication information may include a dual sign-on (or verification) procedure that requires a regular system administrator sign-on (or verification) plus a second authorized person (e.g. a "Security Officer") to access the recovery information.

In 503, the system may provide, to the recovery application, the data identifier (e.g. data identifier 286) for the data (e.g. data 161) to be recovered. For example, recovery information may be located based on the data identifier, which may be associated with particular encrypted data (e.g. encrypted data 284) and particular key shares (e.g. key shares 282). In some embodiments, the recovery information may be forwarded to each storage system (e.g. via an API specific to each storage system) to locate the requested recovery information. Accordingly, in some embodiments, the recovery application may first determine which storage systems store recovery information associated with the data identifier, determine a specific API (e.g. entity-specific API) associated with each relevant storage system, and then access, using the specific API, each storage system to access the required recovery information. Accordingly, in some embodiments, the recovery application may coordinate accessing each of the storage systems associated with the client account to initiate receiving the recovery information from each of the storage systems. For example, the recovery application may authorize the storage systems to send the recovery information directly to the production system in response to performing appropriate authentications. In addition, in some embodiments, the recovery application may be a centralized authentication component, which may store specific (e.g. different) authentication information for each storage system (or service).

Thus, in 504, the system receive, from the first storage system, the encrypted data and the corresponding key associated with the data identifier. For example, as shown in diagram 300, the storage system 180A (e.g. first storage system) stores the actual encrypted data (e.g. encrypted data 284), as well as a corresponding key share 282 ($S_1$).

Accordingly, in 505, the system may receive, from each of at least K-1 of the remaining storage systems, the corresponding key associated with the data identifier. In the example of diagram 300, storage systems 180B, and 180D (e.g. K-1 of the remaining storage systems) provide a corresponding key share 282 (e.g. $S_2$, and $S_4$). For instance, K=3 in diagram 300, and thus, two (2) (e.g. K-1) of the remaining storage systems may be selected. In some embodiments, the remaining storage systems may be selected based on criteria including one or more of a priority order associated with each storage system, a resource consumption associated with each storage system, or a cost associated with accessing each storage system.

In 506, the system may perform (or execute, initiate, etc.) an operation (or function, method, etc.) to reconstruct the secret key (S) using the corresponding keys ($S_1$, $S_2$, and $S_4$) received from the first storage system and the remaining storage systems based on the secret sharing algorithm. In some embodiments, the operation may use a secret sharing algorithm based on a (K, N) threshold scheme (e.g. using Shamir's Secret Sharing algorithm) to reconstruct the secret key (S). In some embodiments, K=N for the threshold scheme. Put another way, in some embodiments, the specified minimum number of the storage systems (K) that are required to recover the data may equal the number of the storage systems (N) associated with the client account. For example, if there are two (2) cloud storage system associated with a client account and K=2, then both the storage system's key shares would be required to reconstruct the secret key (S). In addition, in such embodiments (e.g. N=K=2, or other reasonably small set of storage systems), all of the storage systems associated with a client account may store the encrypted data along with the corresponding key share.

In 507, the system may decrypt the received encrypted data using the reconstructed secret key (S). In some embodiments, the encrypted data may be decrypted within the production system to ensure a certain degree of security. For example, encryption and decryption may be exclusively performed by a component with the production system (e.g. data recovery manager 175).

Optionally, in 508, the system may recover the data associated with the client account using the decrypted data. For example, in response to a disaster event associated with the production system (e.g. data loss within production environment 101), data (e.g. data 161) may be recovered using the decrypted data.

Accordingly, based on the above-described processes, in some embodiments, recovery information may be secured by leveraging multiple cloud-based storage systems (or services).

As noted, the operations (or steps) shown in the above processes are not necessarily performed in the order indicated and may be performed in parallel, as a single operation, or as multiple operations. For example, in process 400, the system may generate the data identifier of the data before, concurrently with, or after, encrypting the data.

Figure 6:
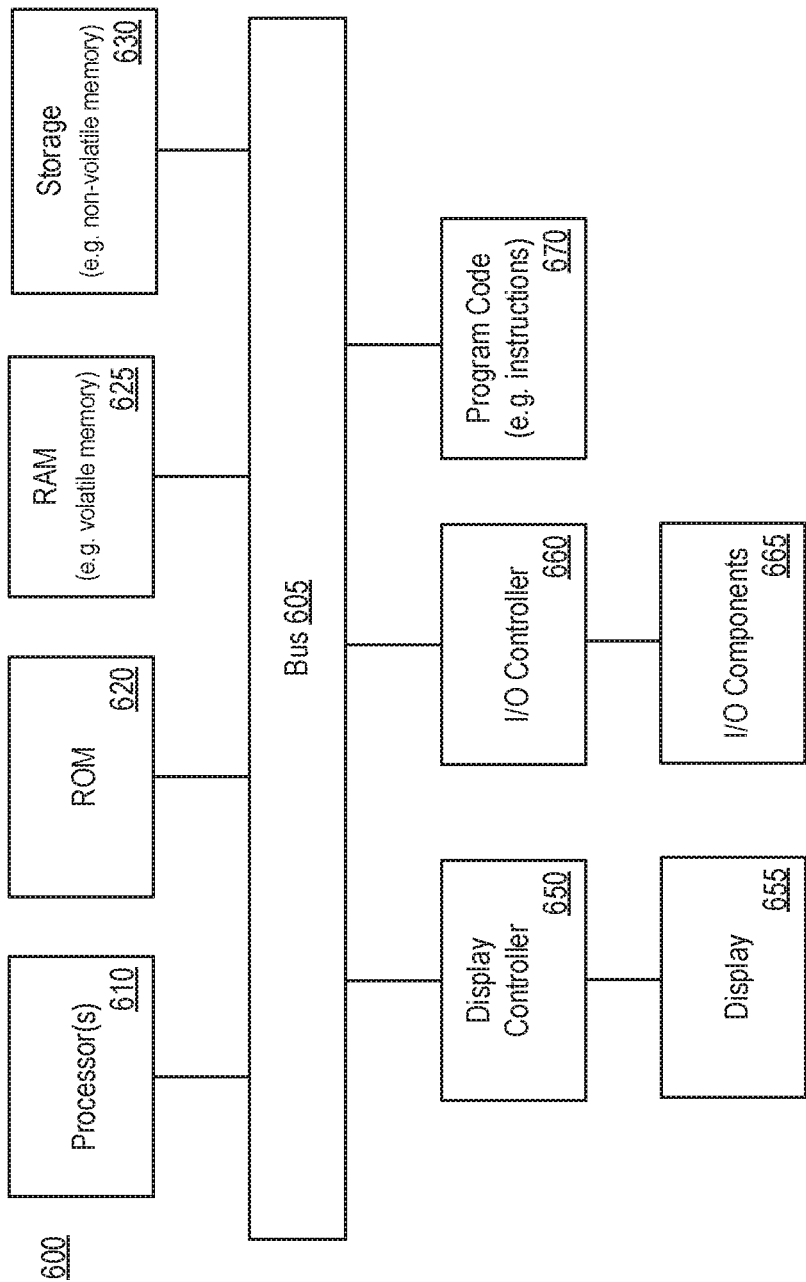
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. production environment 101, storage system 150, data recovery manager 175, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. production system 101, storage system 150, data recovery manager 175, cloud-based recovery component 185, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive, at a production system that manages data associated with a client account, an indication to include the data as part of a data recovery service, the data recovery service storing recovery information for the data within each storage system associated with the client account;
   determine a number of the storage systems (N) associated with the client account;
   obtain, from information associated with the client account, a specified minimum number of the storage systems (K) that are required to recover the data;
   encrypt, by the production system, the data using a secret key (S);
   generate, by the production system, a data identifier for the data;
   perform an operation to generate N key shares of the secret key (S), the operation using a secret sharing algorithm based on a (K, N) threshold scheme requiring at least K number of the N key shares to reconstruct the secret key (S), each of the N key shares corresponding to a different one of the storage systems;
   send, to at least a first storage system for storage as the recovery information, the encrypted data, a corresponding key, and the data identifier;
   send, to each remaining storage system for storage as the recovery information, the corresponding key share, and the data identifier;
   receive, at the production system, an indication to recover the data associated with the client account;
   decrypt, by the production system, the encrypted data using the reconstructed secret key (S); and
   recover, by the production system, the data associated with the client account using the decrypted data.

2. The system of claim 1, wherein sending, to each remaining storage system for storage as the recovery information, the corresponding key share, and the data identifier further includes sending to one or more of the remaining storage systems the encrypted data together with the corresponding key share, and the data identifier.

3. The system of claim 1, wherein the encrypted data, the corresponding key share, and the data identifier comprising the recovery information of the first storage system are stored together as a data object.

4. The system of claim 1, wherein the plurality of instructions, when executed, further cause the one or more processors to:
   provide, to a recovery application in response to receiving the indication to recover the data associated with the client account, authentication information authorizing access to the recovery information stored by the storage systems associated with the client account;
   provide, to the recovery application, the data identifier for the data to be recovered;
   receive, from the first storage system, the encrypted data and the corresponding key associated with the data identifier;

receive, from each of at least K−1 of the remaining storage systems, the corresponding key associated with the data identifier;
perform an operation to reconstruct the secret key (S) using the corresponding keys received from the first storage system and the remaining storage systems based on the secret sharing algorithm; and
decrypt the received encrypted data using the reconstructed secret key (S).

5. The system of claim 4, wherein the specified minimum number of the storage systems (K) that are required to recover the data equals the number of the storage systems (N) associated with the client account number.

6. The system of claim 4, wherein the plurality of instructions, when executed, further cause the one or more processors to:
select the remaining storage systems based on criteria including one or more of a priority order associated with each storage system, a resource consumption associated with each storage system, or a cost associated with accessing each storage system.

7. The system of claim 1, wherein the production system is provided by a first entity, and each storage system associated with the client account is remote from the production system and provided by a different entity than the first entity.

8. The system of claim 1, wherein the recovery application coordinates accessing each of the storage systems associated with the client account to initiate receiving the recovery information from each of the storage systems.

9. A method comprising:
receiving, at a production system that manages data associated with a client account, an indication to include the data as part of a data recovery service, the data recovery service storing recovery information for the data within each storage system associated with the client account;
determining a number of the storage systems (N) associated with the client account;
obtaining, from information associated with the client account, a specified minimum number of the storage systems (K) that are required to recover the data;
encrypting, by the production system, the data using a secret key (S);
generating, by the production system, a data identifier for the data;
performing an operation to generate N key shares of the secret key (S), the operation using a secret sharing algorithm based on a (K, N) threshold scheme requiring at least K number of the N key shares to reconstruct the secret key (S), each of the N key shares corresponding to a different one of the storage systems;
sending, to at least a first storage system for storage as the recovery information, the encrypted data, a corresponding key, and the data identifier;
sending, to each remaining storage system for storage as the recovery information, the corresponding key share, and the data identifier;
decrypting the received encrypted data using the reconstructed secret key (S); and
recovering, by the production system, the data associated with the client account using the decrypted data.

10. The method of claim 9, wherein sending, to each remaining storage system for storage as the recovery information, the corresponding key share, and the data identifier further includes sending to one or more of the remaining storage systems the encrypted data together with the corresponding key share, and the data identifier.

11. The method of claim 9, wherein the encrypted data, the corresponding key share, and the data identifier comprising the recovery information of the first storage system are stored together as a data object.

12. The method of claim 9, further comprising:
providing, to a recovery application in response to receiving the indication to recover the data associated with the client account, authentication information authorizing access to the recovery information stored by the storage systems associated with the client account;
providing, to the recovery application, the data identifier for the data to be recovered;
receiving, from the first storage system, the encrypted data and the corresponding key associated with the data identifier;
receiving, from each of at least K−1 of the remaining storage systems, the corresponding key associated with the data identifier;
performing an operation to reconstruct the secret key (S) using the corresponding keys received from the first storage system and the remaining storage systems based on the secret sharing algorithm; and
decrypting the received encrypted data using the reconstructed secret key (S).

13. The method of claim 12, wherein the specified minimum number of the storage systems (K) that are required to recover the data equals the number of the storage systems (N) associated with the client account number.

14. The method of claim 12, further comprising:
selecting the remaining storage systems based on criteria including one or more of a priority order associated with each storage system, a resource consumption associated with each storage system, or a cost associated with accessing each storage system.

15. A computer program product comprising a non-transitory computer-readable medium having a computer-readable program code embodied therein to be executed by one or more processors, the program code including instructions to:
receive, at a production system that manages data associated with a client account, an indication to include the data as part of a data recovery service, the data recovery service storing recovery information for the data within each storage system associated with the client account;
determine a number of the storage systems (N) associated with the client account;
obtain, from information associated with the client account, a specified minimum number of the storage systems (K) that are required to recover the data;
encrypt, by the production system, the data using a secret key (S);
generate, by the production system, a data identifier for the data;
perform an operation to generate N key shares of the secret key (S), the operation using a secret sharing algorithm based on a (K, N) threshold scheme requiring at least K number of the N key shares to reconstruct the secret key (S), each of the N key shares corresponding to a different one of the storage systems;
send, to at least a first storage system for storage as the recovery information, the encrypted data, a corresponding key, and the data identifier;
send, to each remaining storage system for storage as the recovery information, the corresponding key share, and the data identifier;

decrypt the received encrypted data using the reconstructed secret key (S); and recover, by the production system, the data associated with the client account using the decrypted data.

16. The computer program product of claim 15, wherein sending, to each remaining storage system for storage as the recovery information, the corresponding key share, and the data identifier further includes sending to one or more of the remaining storage systems the encrypted data together with the corresponding key share, and the data identifier.

17. The computer program product of claim 15, wherein the encrypted data, the corresponding key share, and the data identifier comprising the recovery information of the first storage system are stored together as a data object.

18. The computer program product of claim 15, wherein the program code includes further instructions to:

provide, to a recovery application in response to receiving the indication to recover the data associated with the client account, authentication information authorizing access to the recovery information stored by the storage systems associated with the client account;

provide, to the recovery application, the data identifier for the data to be recovered;

receive, from the first storage system, the encrypted data and the corresponding key associated with the data identifier;

receive, from each of at least K–1 of the remaining storage systems, the corresponding key associated with the data identifier;

perform an operation to reconstruct the secret key (S) using the corresponding keys received from the first storage system and the remaining storage systems based on the secret sharing algorithm; and decrypt the received encrypted data using the reconstructed secret key (S).

19. The computer program product of claim 18, wherein the specified minimum number of the storage systems (K) that are required to recover the data equals the number of the storage systems (N) associated with the client account number.

20. The computer program product of claim 18, wherein the program code includes further instructions to:

select the remaining storage systems based on criteria including one or more of a priority order associated with each storage system, a resource consumption associated with each storage system, or a cost associated with accessing each storage system.

* * * * *